United States Patent
Wong et al.

(10) Patent No.: US 11,952,478 B2
(45) Date of Patent: Apr. 9, 2024

(54) LATEX FORMULATION AND X-RAY DETECTABLE GLOVE PREPARED THEREOF

(71) Applicant: TOP GLOVE INTERNATIONAL SDN. BHD., Klang (MY)

(72) Inventors: Chong Ban Wong, Klang (MY); Vidhyaa Paroo Indran, Klang (MY); Nor Azlan Zulkifly, Klang (MY)

(73) Assignee: TOP GLOVE INTERNATIONAL SDN. BHD., Klang (MY)

( * ) Notice: Subject to any disclaimer, the term of this patent is extended or adjusted under 35 U.S.C. 154(b) by 255 days.

(21) Appl. No.: 17/355,164

(22) Filed: Jun. 22, 2021

(65) Prior Publication Data

US 2021/0401096 A1 Dec. 30, 2021

(30) Foreign Application Priority Data

Jun. 26, 2020 (MY) .............................. PI2020003335

(51) Int. Cl.
*C08K 3/22* (2006.01)
*C08L 9/02* (2006.01)

(52) U.S. Cl.
CPC ........ *C08K 3/22* (2013.01); *C08L 9/02* (2013.01); *C08K 2003/2296* (2013.01)

(58) Field of Classification Search
None
See application file for complete search history.

(56) References Cited

U.S. PATENT DOCUMENTS

| | | |
|---|---|---|
| 9,808,039 B2 | 11/2017 | Enomoto et al. |
| 2004/0154072 A1 | 8/2004 | Connor |
| 2020/0087482 A1 | 3/2020 | Yanagawa et al. |
| 2020/0123374 A1 | 4/2020 | Plamthottam |
| 2020/0199311 A1 * | 6/2020 | Foo .................. C08K 3/08 |

FOREIGN PATENT DOCUMENTS

| | | | | |
|---|---|---|---|---|
| CN | 108690274 A | * | 10/2018 | ............. C08K 13/06 |
| WO | WO 2013/153390 A1 | | 10/2013 | |
| WO | WO-2019045556 A1 | * | 3/2019 | ........... C09D 133/02 |
| WO | WO-2019139467 A1 | * | 7/2019 | ......... A41D 19/0055 |
| WO | WO 2020/113286 A1 | | 6/2020 | |

OTHER PUBLICATIONS

Wu, CN-108690274-A, Oct. 23, 2018 (machine translation) (Year: 2018).*
MY Application PI2020003335 Search Report dated Jul. 27, 2022.
EP 21181675.6 Extended European Search Report completed Nov. 24, 2021.

* cited by examiner

*Primary Examiner* — Cheng Yuan Huang
(74) *Attorney, Agent, or Firm* — Alston & Bird LLP

(57) ABSTRACT

A glove that is X-ray detectable prepared from a latex formulation comprises a base polymer, an accelerator, a vulcanizing agent, a surfactant, a pH adjuster, an antifoaming agent and a thickener characterized in that the latex formulation further includes radiocontrast filler, wherein the radiocontrast filler comprises a radiocontrast agent, a surfactant, a thickener and a solvent, wherein the radiocontrast filler is used in an amount of at least 10 phr of the latex formulation and wherein the radiocontrast filler has total solid content of 45%.

5 Claims, No Drawings

LATEX FORMULATION AND X-RAY DETECTABLE GLOVE PREPARED THEREOF

CROSS-REFERENCE TO RELATED APPLICATIONS

This application claims priority to Malaysian Patent Application No. PI2020003335 filed Jun. 26, 2020, which is incorporated by reference in its entirety for all purposes.

FIELD OF THE INVENTION

The present invention relates to a latex formulation and glove with X-ray detectable property prepared thereof, wherein the glove having enhanced visibility and X-ray detectable property particularly to detect glove contamination in food and beverages industries.

BACKGROUND OF THE INVENTION

Gloves are important protective equipment used to avoid cross contamination in food and beverages industries. Workers and individuals involved in this industry are strictly required to wear protective gloves during food and beverages handling to avoid cross contamination that would transmit from hand to food and beverages. However, in some cases, the glove itself could become a contaminant. For instance, torn glove pieces may be identified on the food in which the process of identification through visual inspection is tedious and time consuming.

In addition, visual inspection is unreliable as we can only inspect the contamination on the surface of the food and beverages. Thus, a high efficiency detection method is needed in the food and beverages industries to detect presence of contaminants. Various approaches have been applied and one of them is by incorporating a radiocontrast filler into the glove formulation. The radiocontrast filler is a substance used to enhance visibility and detection in X-ray based imaging techniques such as computed tomography, radiography and fluoroscopy.

Simply, shadows are displayed based on different thickness and densities of food or beverages when a beam of X-ray from an X-ray generator is projected towards the food or beverages to be inspected. Darker shadows appear when thicker and denser contaminant are found in the food or beverages.

In addition, it was easier to detect large glove pieces in the food or beverages. In contrary, it was difficult to detect small glove pieces in the food or beverages when glove piece has low thickness. In such cases, the radiocontrast filler with a higher density than the food or beverages is incorporated into the glove formulation for a reliable detection.

One major drawback faced during production of X-ray detectable glove with higher density radiocontrast filler is that mechanical properties and wearer's comfort during use of the glove are significantly reduced. This is due to the use of increased amount of the radiocontrast filler in the glove formulation for detection enhancement.

In addition, higher density radiocontrast filler in the glove formulation increases sedimentation rate of the radiocontrast particles in the glove formulation. High sedimentation rate of the radiocontrast particles in the glove formulation is undesirable as it contributes to the non-uniformity of the radiocontrast particles in the glove formulation which subsequently results in low X-ray detection.

Having said the above, it is obvious that existing approach has its own disadvantages in producing X-ray detectable glove having radiocontrast filler. As such there is a need to:

(1) identify an appropriate radiocontrast filler to be incorporated in the glove formulation for detection of the glove contamination in the food and beverages industries through X-ray based imaging techniques; as well as (2) identify a method to incorporate higher density radiocontrast filler in the glove formulation without hampering mechanical properties of the glove.

SUMMARY OF THE INVENTION

The present invention relates to a glove that is X-ray detectable prepared from a latex formulation comprising a base polymer, an accelerator, a vulcanizing agent, a surfactant, a pH adjuster, an antifoaming agent and a thickener characterized in that the latex formulation further includes a radiocontrast filler, wherein the radiocontrast filler comprising a radiocontrast agent, a surfactant, a thickener and a solvent, wherein the radiocontrast filler is used in an amount of at least 10 phr of the latex formulation and wherein the radiocontrast filler has total solid content of 45%.

Additional aspects, features and advantages of the invention will become apparent to those skilled in the art upon consideration of the following detailed description of preferred embodiments of the invention.

DETAILED DESCRIPTION OF THE INVENTION

Detailed description of preferred embodiments of the present invention is disclosed herein. It should be understood, however, that the embodiments are merely exemplary of the present invention, which may be embodied in various forms. Therefore, the details disclosed herein are not to be interpreted as limiting, but merely as the basis for the claims and for teaching one skilled in the art of the invention. The numerical data or ranges used in the specification are not to be construed as limiting.

The present invention relates to a latex formulation and glove with X-ray detectable property prepared thereof. Particularly, the present invention relates but not limited to natural rubber (NR) glove, acrylonitrile butadiene rubber (NBR) glove or hybrid of polychloroprene rubber (CR/NBR) glove with X-ray detectable property, that is required for food and beverages industries. Ideally, this approach is taken to detect glove contamination in the food or beverages during packaging process before reaching the market.

The glove of the present invention includes a radiocontrast filler that enhances visibility and detection of the glove in the food or beverages as a measure to detect glove contamination in the food or beverages which will be further detailed in the subsequent pages and/or sections. Hereafter, the glove of the present invention that includes a radiocontrast filler will be referred as X-ray detectable glove. The X-ray detectable glove of the present invention ensures the radiocontrast filler is safe to be used in the food and beverages industries. The X-ray detectable glove of the present invention can be detected through an X-ray based imaging technique such as but not limited to computed tomography, radiography, fluoroscopy or combination therefrom.

The present invention may also be extended to gloves prepared from both natural and synthetic rubbers such as but not limited to NR, NBR, carboxylated NBR (X-NBR), CR, polyisoprene rubber, butyl rubber, polybutadiene rubber or mixtures therefrom, preferably NR, NBR and CR/NBR. Likewise, the X-ray detectable glove of the present invention may be used in various other industries/applications such as but not limited to cosmetic, biomedical and/or healthcare.

The present invention discusses on a latex formulation comprising radiocontrast filler with average particle diameter size ranging between 5 μm to 50 μm. The radiocontrast filler is used in an amount of at least 10 phr of the latex formulation and wherein the radiocontrast filler has total solid content of 45%.

The latex formulation of the present invention comprises a base polymer, a whitening agent, an accelerator, a vulcanizing agent, a stripping agent, a surfactant, a pH adjuster, an antioxidant, an antifoaming agent, a thickener and a radiocontrast filler, which is summarized in the tables 1 to 3. The radiocontrast filler comprises a radiocontrast agent, a surfactant, a thickener and a solvent. The base polymer is any one selected from the group consisting of NR, NBR and CR/NBR, wherein the base polymer is used in an amount of 100 phr.

The whitening agent is titanium dioxide. The accelerator is selected from the group consisting of zinc diethyl-dithiocarbamate (ZDEC), zinc dibenzyl-dithiocarbamate (ZBEC), zinc dibutyl-dithiocarbamate (ZDBC), zinc 2-mercaptobenzothiazole (ZMBT) and mixtures therefrom, preferably mixture of ZDEC and ZDBC. The vulcanizing agent is selected from the group consisting of sulphur, zinc oxide and mixtures therefrom, preferably mixtures therefrom. The stripping agent is selected from the group consisting of polyethylene wax emulsion, propylene glycol and mixtures therefrom, preferably polyethylene wax emulsion.

The surfactant is selected from the group consisting of sodium dodecylbenzene sulphonate, potassium laurate, monosodium salt of sulphated methyl oleate, sodium naphthalene formaldehyde sulphonate, disodium n-octadecylsulphosuccinamate, sodium polyacrylate, ammonium polyacrylate and mixtures therefrom, preferably sodium naphthalene formaldehyde sulphonate. The pH adjuster is selected from the group consisting of ammonia, sodium hydroxide, potassium hydroxide and mixture therefrom, preferably ammonia or a mixture of ammonia and potassium hydroxide. The antioxidant is phenolic antioxidant, wherein the phenolic antioxidant is made from a butylated reaction product of p-cresol and dicyclopentadiene and wherein the phenolic antioxidant has non-discoloring properties.

The antifoaming agent is silicone emulsion. The thickener is selected from the group consisting of acrylic copolymer containing carboxyl group, polysaccharide based thickener and mixtures therefrom, preferably acrylic copolymer containing carboxyl group, wherein the acrylic copolymer containing carboxyl group is ammonium polyacrylate.

The radiocontrast filler is used in dispersion form. The radiocontrast filler has a viscosity (Brookfield DV S02 @ 100 rpm) ranging between 800 cP to 1300 cP, preferably between 900 cP to 1200 cP. Any viscosity (Brookfield DV S02 @ 100 rpm) below 800 cP is at risk of the radiocontrast agent migrating to the glove surface which is undesirable. Similarly, any viscosity (Brookfield DV S02 @ 100 rpm) above 1300 cP is at a risk of having a glove with insufficient flexibility due to sedimentation which is undesirable as well. In terms of stability, safety and availability, the radiocontrast filler is reliable since it satisfies any food sanitation law and can be used without any concern in the food industry.

The radiocontrast agent in the radiocontrast filler is selected from the group consisting of barium sulphate, nickel, zinc, iron, iron oxide magnetite, bismuth oxide and gadolinium, preferably barium sulphate. The radiocontrast agent is used in an amount ranging between 40% to 60%, preferably 45% to 55% by weight of the radiocontrast filler.

The surfactant in the radiocontrast filler is selected from the group consisting of sodium dodecylbenzene sulphonate, potassium laurate, monosodium salt of sulphated methyl oleate, sodium naphthalene formaldehyde sulphonate, disodium n-octadecylsulphosuccinamate, sodium polyacrylate, ammonium polyacrylate and mixtures therefrom, preferably sodium naphthalene formaldehyde sulphonate. The surfactant is used in an amount ranging between 1% to 10%, preferably 2% to 9% by weight of the radiocontrast filler.

The thickener in the radiocontrast filler is selected from the group consisting of acrylic copolymer containing carboxyl group, polysaccharide based thickener and mixtures therefrom, preferably acrylic copolymer containing carboxyl group, wherein the acrylic copolymer containing carboxyl group is ammonium polyacrylate. The thickener is used in an amount ranging between 1% to 10%, preferably 2% to 9% by weight of the radiocontrast filler.

The solvent in the radiocontrast filler is selected from the group consisting of tap water, distilled water and mixtures therefrom, preferably tap water. The solvent makes up the remaining content (by weight) of the radiocontrast filler.

Tables 1 to 3 show chemical components and compositions of NR, NBR and CR/NBR gloves of the present invention.

TABLE 1

Chemical components and compositions of X-ray detectable NR glove

| Materials | Working range (phr) | Preferred range (phr) | Typical value (phr) |
|---|---|---|---|
| NR latex | 100.00 | 100.00 | 100.00 |
| Ammonia | 0.10 to 1.00 | 0.15 to 0.90 | 0.20 |
| Mixture of ZDEC and ZBEC | 0.10 to 2.00 | 0.17 to 1.90 | 0.18 |
| Ammonium polyacrylate | 0.10 to 0.50 | 0.15 to 0.40 | 0.20 |
| Sulphur | 0.50 to 2.00 | 0.60 to 1.90 | 1.30 |
| Zinc oxide | 0.30 to 1.00 | 0.40 to 0.90 | 0.45 |
| Phenolic antioxidant | 0.10 to 0.70 | 0.15 to 0.60 | 0.40 |
| Polyethylene wax emulsion | 0.10 to 2.00 | 0.15 to 1.90 | 1.00 |
| Sodium naphthalene formaldehyde sulphonate | 0.10 to 2.00 | 0.15 to 1.90 | 0.20 |
| Radiocontrast filler of the present invention | 10.00 to 60.00 | 11.00 to 59.00 | 50.00 |
| Silicone emulsion | 0.01 to 0.08 | 0.02 to 0.07 | 0.05 |

TABLE 2

Chemical components and compositions of X-ray detectable NBR glove

| Materials | Working range (phr) | Preferred range (phr) | Typical value (phr) |
|---|---|---|---|
| NBR latex | 100.00 | 100.00 | 100.00 |
| Potassium hydroxide | 0.50 to 3.00 | 0.60 to 2.90 | 1.60 |
| Zinc oxide | 0.10 to 2.00 | 0.20 to 1.90 | 0.30 |
| Ammonia | 0.10 to 1.00 | 0.20 to 0.90 | 0.40 |
| Mixture of ZDEC and ZDBC | 0.10 to 2.00 | 0.20 to 1.90 | 0.90 |
| Sulphur | 0.30 to 2.00 | 0.40 to 1.90 | 0.50 |
| Polyethylene wax emulsion | 0.10 to 0.50 | 0.15 to 0.45 | 0.30 |
| Titanium dioxide | 0.20 to 1.50 | 0.25 to 1.45 | 0.30 |
| Sodium dodecylbenzene | 0.10 to 1.00 | 0.15 to 0.90 | 0.60 |

TABLE 2-continued

Chemical components and compositions of X-ray detectable NBR glove

| Materials | Working range (phr) | Preferred range (phr) | Typical value (phr) |
|---|---|---|---|
| sulphonate | | | |
| Silicone emulsion | 0.01 to 0.09 | 0.02 to 0.08 | 0.04 |
| Sodium naphthalene formaldehyde sulphonate | 0.10 to 1.00 | 0.15 to 0.95 | 0.40 |
| Ammonium polyacrylate | 0.10 to 0.50 | 0.15 to 0.40 | 0.20 |
| Radiocontrast filler of the present invention | 10.00 to 60.00 | 11.00 to 59.00 | 50.00 |

TABLE 3

Chemical components and compositions of X-ray detectable CR/NBR glove

| Materials | Working range (phr) | Preferred range (phr) | Typical value (phr) |
|---|---|---|---|
| CR latex | 1.00 to 100.00 | 10.00 to 90.00 | 50.00 |
| NBR latex | 1.00 to 100.00 | 10.00 to 90.00 | 50.00 |
| Potassium hydroxide | 0.10 to 2.00 | 0.15 to 1.90 | 1.20 |
| Mixture of ZDEC and ZDBC | 0.10 to 2.00 | 0.20 to 1.90 | 1.20 |
| Ammonium polyacrylate | 0.10 to 0.50 | 0.15 to 0.40 | 0.20 |
| Sulphur | 0.50 to 2.00 | 0.60 to 1.90 | 1.00 |
| Disodium n-octadecyl-sulphosuccinamate | 0.10 to 1.00 | 0.15 to 0.90 | 0.30 |
| Zinc oxide | 0.50 to 2.00 | 0.60 to 1.90 | 1.50 |
| Phenolic antioxidant | 0.50 to 2.00 | 0.60 to 1.90 | 1.20 |
| Titanium dioxide | 0.50 to 3.00 | 0.60 to 2.90 | 2.00 |
| Monosodium salt of sulphated methyl oleate | 0.10 to 2.00 | 0.15 to 1.90 | 0.50 |
| Radiocontrast filler of the present invention | 10.00 to 60.00 | 11.00 to 59.00 | 50.00 |
| Silicone emulsion | 0.01 to 0.20 | 0.02 to 0.18 | 0.15 |

The X-ray detectable glove of the present invention is prepared using latex formulation as disclosed above adopting a method commonly known in the glove manufacturing industry. The method to prepare the X-ray detectable glove comprising the steps of:
i. cleaning/washing formers to produce cleaned formers, wherein the first step is treatment using acidic solutions, the second step is treatment using alkaline solutions, the third step is washing using water, the fourth step is brushing and the fifth step is washing using water to ensure the former surface is cleaned;
ii. dipping the cleaned former obtained in step (i) into a coagulant solution at a temperature between 40° C. to 65° C. for a time period ranging from 15 seconds to 30 seconds to coat a coagulant layer on the former, wherein the coagulant solution is any conventional coagulant solution;
iii. drying the coagulant layer coated on the former obtained in step (ii) at a temperature between 80° C. to 200° C. for a time period ranging from 1 minute to 10 minutes;
iv. dipping the former obtained in step (iii) into a first dipping tank containing latex formulation at a temperature between 20° C. to 40° C. for a time period ranging from 25 seconds to 35 seconds to produce a first latex layer, wherein the first latex layer has a total solid content of 10% by weight to 50% by weight;
v. drying the first latex layer coated on the former obtained in step (iv) at a temperature between 80° C. to 200° C. for a time period ranging from 20 seconds to 5 minutes;
vi. dipping the former obtained in step (v) into a second dipping tank containing latex formulation at a temperature between 20° C. to 40° C. for a time period ranging from 25 seconds to 35 seconds to produce a second latex layer, wherein the second latex layer has a total solid content of 10% by weight to 50% by weight;
vii. drying the second latex layer coated on the former obtained in step (vi) at a temperature between 80° C. to 200° C. for a time period ranging from 20 seconds to 5 minutes;
viii. treating the second latex layer coated on the former obtained in step (vii) with hot water at a temperature between 55° C. to 70° C. for a time period ranging from 30 seconds to 60 seconds to leach out chemical residues to form pre-leached latex film;
ix. curing the pre-leached latex film coated on the former obtained in step (viii) at a temperature between 90° C. to 300° C. for a time period ranging from 20 minutes to 35 minutes to produce latex film;
x. treating the latex film coated on the former obtained in step (ix) with chlorine water at ambient temperature for a time period ranging from 10 seconds to 60 seconds to obtain treated latex film;
xi. treating the treated latex film obtained in step (x) with hot water at a temperature between 55° C. to 70° C. for a time period ranging from 30 seconds to 60 seconds to leach out chemical residues to obtain post-leached latex film;
xii. drying the post-leached latex film coated on the former obtained in step (xi) at a temperature between 80° C. to 300° C. for a time period ranging from 20 seconds to 5 minutes to produce X-ray detectable glove; and
xiii. stripping the X-ray detectable glove obtained in step (xii) from the former for donning.

The X-ray detectable glove of the present invention has a thickness ranging between 0.25 mm to 0.35 mm. The X-ray detectable glove of the present invention is able to be detected by but not limited to an X-ray detector with a minimum glove thickness of 0.25 mm, provided that the mechanical properties of the gloves are not compromised. The X-ray detectable glove of the present invention may be single layered or multi-layered.

The X-ray detectable glove of the present invention has a tensile strength ranging between 14.90 MPa to 27.80 MPa, an elongation at break ranging between 477% to 842%, modulus @ 500% ranging between 4.41 MPa to 17.31 MPa, force at break ranging between 10.55 N to 44.25 N, abrasion resistance ranging between Level 1 to Level 2 and puncture resistance of Level 1, providing that it meets (1) requirements of ASTM D3578 or ASTM D6319 or ASTM D6977 for both before and after aging for tensile strength, elongation at break and modulus @ 500% and (2) requirement of EN 455 for both before and after aging for force at break. Further, the X-ray detectable glove of the present invention meets the requirements of overall migration test (OMT) based on European regulation for food contact materials for ethanol and acetic acid.

The following examples are constructed to illustrate the present invention in a non-limiting sense.

X-Ray Detectable NR Glove of the Present Invention

The X-ray detectable NR glove of the present invention is prepared using the composition as summarized in Table 1 adopting a method commonly known in the glove manufacturing industry.

The X-ray detectable NR glove of the present invention is tested against the ASTM D3578, EN 455 and EN 388 standards. ASTM D3578 standard is used to measure tensile strength, elongation at break and modulus @ 500% properties of the X-ray detectable NR glove. EN 455 standard is used to measure force at break (FAB) property of the X-ray detectable NR glove. EN 388 standard is used to measure abrasion and puncture resistances properties of the X-ray detectable NR glove.

Table 4 displays the results tested against ASTM D3578 (i.e. tensile strength, elongation at break and modulus @ 500%) for X-ray detectable NR glove of the present invention and the conventional NR glove (without radiocontrast filler).

TABLE 4

Results tested against ASTM D3578 for X-ray detectable NR glove of the present invention and the conventional NR glove (without radiocontrast filler)

| Set | Tensile strength, MPa | | Elongation at break, % | | Modulus @ 500%, MPa | |
|---|---|---|---|---|---|---|
| | Before aging | After aging | Before aging | After aging | Before aging | After aging |
| Conventional NR glove | 26.50 | 25.70 | 922.00 | 959.00 | 1.36 | 1.22 |
| X-ray detectable NR glove of the present invention | 27.80 | 22.20 | 842.00 | 835.00 | 5.31 | 4.41 |
| Standards | Min 18 MPa | Min 14 MPa | Min 650% | Min 500% | Max 5.5 MPa | Not stated |

Remark: Aging condition: Heating at a temperature of 70° C. at a period of 7 days Based on Table 4, it is noticeable that the X-ray detectable NR glove of the present invention meets all the requirements of ASTM D3578 for the tensile strength, elongation at break and modulus @ 500% properties.

Table 5 displays the results tested against EN455 (i.e. FAB) for X-ray detectable NR glove of the present invention and the conventional NR glove (without radiocontrast filler).

TABLE 5

Results tested against EN455 for X-ray detectable NR glove of the present invention and the conventional NR glove (without radiocontrast filler)

| Set | Thickness, mm | | Force at Break, N | |
|---|---|---|---|---|
| | Before aging | After aging | Before aging | After aging |
| Conventional NR glove | 0.27 | 0.25 | 17.90 | 14.54 |
| X-ray detectable NR glove of the present invention | 0.25 | 0.25 | 10.27 | 8.34 |
| Standard | | | Min 6 | Min 6 |

Remark: Aging condition: Heating at a temperature of 70° C. at a period of 7 days Based on Table 5, it is noticeable that the X-ray detectable NR glove of the present invention meets the requirements of EN 455 for the FAB property.

Table 6 displays the results tested against EN388 (i.e. abrasion and puncture resistances) for X-ray detectable NR glove of the present invention and the conventional NR glove (without radiocontrast filler).

TABLE 6

Results tested against EN388 for X-ray detectable NR glove of the present invention and the conventional NR glove (without radiocontrast filler)

| | Abrasion resistance, Cycles | | Puncture resistance, N | |
|---|---|---|---|---|
| Test | Conventional NR glove | X-ray detectable NBR glove of the present invention | Conventional NR glove | X-ray detectable NBR glove of the present invention |
| Performance level | 322 (Level 1) | 251 (Level 1) | 24.40 (Level 1) | 21.88 (Level 1) |

Based on Table 6, it is noticeable that the X-ray detectable NR glove of the present invention has comparable abrasion and puncture resistances level with conventional NR glove.

Table 7 displays the results tested against OMT based on European regulation for food contact materials (i.e. ethanol and acetic acid) for X-ray detectable NR glove of the present invention and the conventional NR glove (without radiocontrast filler).

TABLE 7

Results tested against OMT based on European regulation for food contact materials for X-ray detectable NR glove of the present invention and the conventional NR glove (without radiocontrast filler)

| | Overall migration limit (mg/dm$^3$) | |
|---|---|---|
| Set | Ethanol | Acetic Acid |
| Conventional NR glove | 9.44 | 8.97 |
| X ray detectable NR glove of the present invention | 8.76 | 6.98 |
| Standard limit | <10 mg/dm$^3$ | |

Based on Table 7, it is noticeable that the X-ray detectable NR glove of the present invention meets the requirements of OMT based on European regulation for food contact materials. Hence, the X-ray detectable NR glove of the present invention is safe to be used in the food and beverages industries.

X-Ray Detectable NBR Glove of the Present Invention

The X-ray detectable NBR glove of the present invention is prepared using the composition as summarized in Table 2 adopting a method commonly known in the glove manufacturing industry.

The X-ray detectable NBR glove of the present invention is tested against the ASTM D6319, EN 455 and EN 388 standards. ASTM D6319 standard is used to measure tensile strength, elongation at break and modulus @ 500% properties of the X-ray detectable NBR glove. EN 455 standard is used to measure FAB property of the X-ray detectable NBR glove. EN 388 standard is used to measure abrasion and puncture resistances properties of the X-ray detectable NBR glove.

Table 8 displays the results tested against ASTM D6319 (i.e. tensile strength, elongation at break and modulus @ 500%) for X-ray detectable NBR glove of the present invention and the conventional NBR glove (without radiocontrast filler).

TABLE 8

Results tested against ASTM D6319 for X-ray detectable NBR glove of the present invention and the conventional NBR glove (without radiocontrast filler)

| Set | Tensile strength, MPa | | Elongation at break, % | | Modulus @ 500%, MPa | |
|---|---|---|---|---|---|---|
| | Before aging | After aging | Before aging | After aging | Before aging | After aging |
| Conventional NBR glove | 30.50 | 20.86 | 507.50 | 470.70 | 8.53 | Nil |
| X-ray detectable NBR glove of the present invention | 15.20 | 14.90 | 524.00 | 477.00 | 12.62 | Nil |
| Standards | Min 14 MPa | Min 14 MPa | Min 500% | Min 400% | Not stated | Not stated |

Remark: Aging condition: Heating at a temperature of 100° C. at a period of 22 hours Based on Table 8, it is noticeable that the X-ray detectable NBR glove of the present invention meets all the requirements of ASTM D6319 for the tensile strength, elongation at break and modulus @ 500% properties.

Table 9 displays the results tested against EN 455 (i.e. FAB) for X-ray detectable NBR glove of the present invention and the conventional NBR glove (without radiocontrast filler).

TABLE 9

Results tested against EN 455 for X-ray detectable NBR glove of the present invention and the conventional NBR glove (without radiocontrast filler)

| Set | Thickness, mm | | Force at Break, N | |
|---|---|---|---|---|
| | Before aging | After aging | Before aging | After aging |
| Conventional NBR glove | 0.30 | 0.30 | 32.25 | 28.73 |
| X-ray detectable NBR glove of the present invention | 0.30 | 0.30 | 15.92 | 17.10 |
| Standard | | | Min 6 | Min 6 |

Remark: Aging condition: Heating at a temperature of 100° C. at a period of 22 hours Based on Table 9, it is noticeable that the X-ray detectable NBR glove of the present invention meets the requirements of EN 455 for the FAB property.

Table 10 displays the results tested against EN 388 (i.e. abrasion and puncture resistances) for X-ray detectable NBR glove of the present invention and the conventional NBR glove (without radiocontrast filler).

TABLE 10

Results tested against EN 388 for X-ray detectable NBR glove of the present invention and the conventional NBR glove (without radiocontrast filler)

| | Abrasion resistance, Cycles | | Puncture resistance, N | |
|---|---|---|---|---|
| Test | Conventional NBR glove | X-ray detectable NBR glove of the present invention | Conventional NBR glove | X-ray detectable NBR glove of the present invention |
| Performance level | 574 (Level 2) | 756 (Level 2) | 41.2 (Level 1) | 30.2 (Level 1) |

Based on Table 10, it is noticeable that the X-ray detectable NBR glove of the present invention has comparable abrasion and puncture resistances level with conventional NBR glove.

Table 11 displays the results tested against OMT based on European regulation for food contact materials (i.e. ethanol and acetic acid) for X-ray detectable NBR glove of the present invention and the conventional NBR glove (without radiocontrast filler).

TABLE 11

Results tested against OMT based on European regulation for food contact materials for X-ray detectable NBR glove of the present invention and the conventional NBR glove (without radiocontrast filler)

| | Overall migration limit (mg/dm$^3$) | |
|---|---|---|
| Set | Ethanol | Acetic Acid |
| Conventional NBR glove | 4.53 | 8.97 |
| X ray detectable NBR glove of the present invention | 3.27 | 6.98 |
| Standard limit | <10 mg/dm$^3$ | |

Based on Table 11, it is noticeable that the X-ray detectable NBR glove of the present invention meets the requirements of OMT based on European regulation for food contact materials. Hence, the X-ray detectable NBR glove of the present invention is safe to be used in the food and beverages industries.

X-Ray Detectable CR/NBR Glove of the Present Invention

The X-ray detectable CR/NBR glove of the present invention is prepared using the composition as summarized in Table 3 adopting a method commonly known in the glove manufacturing industry.

The X-ray detectable CR/NBR glove of the present invention is tested against the ASTM D6977, EN 455 and EN 388 standards. ASTM D6977 standard is used to measure tensile strength, elongation at break and modulus @ 500% properties of the X-ray detectable CR/NBR glove. EN 455 standard is used to measure force at break (FAB) property of the X-ray detectable CR/NBR glove. EN 388 standard is used to measure abrasion and puncture resistances properties of the X-ray detectable CR/NBR glove.

Table 12 displays the results tested against ASTM D6977 (i.e. tensile strength, elongation at break and modulus @ 500%) between X-ray detectable CR/NBR glove of the present invention and the conventional CR/NBR glove (without radiocontrast filler).

TABLE 12

Results tested against ASTM D6977 for X-ray detectable CR/NBR glove of the present invention and the conventional CR/NBR glove (without radiocontrast filler)

| Set | Tensile strength, MPa | | Elongation at break, % | | Modulus @ 500%, MPa | |
|---|---|---|---|---|---|---|
| | Before aging | After aging | Before aging | After aging | Before aging | After aging |
| Conventional CR/NBR glove | 19.00 | 26.20 | 592.70 | 598.40 | 11.90 | 16.90 |
| X-ray detectable CR/NBR glove | 16.30 | 18.20 | 504.00 | 494.00 | 14.87 | 17.31 |
| Standards | Min 14 MPa | Min 14 MPa | Min 500% | Min 400% | Not stated | Not stated |

Remark: Aging condition: Heating at a temperature of 100° C. at a period of 22 hours Based on Table 12, it is noticeable that the X-ray detectable CR/NBR glove of the present invention meets all the requirements of ASTM D6977 for the tensile strength, elongation at break and modulus @ 500% properties.

Table 13 displays the results tested against EN 455 (i.e. FAB) for X-ray detectable CR/NBR glove of the present invention and the conventional CR/NBR glove (without radiocontrast filler).

TABLE 13

Results tested against EN 455 for X-ray detectable CR/NBR glove of the present invention and the conventional CR/NBR glove (without radiocontrast filler)

|  | Thickness, mm | | Force at Break, N | |
| --- | --- | --- | --- | --- |
| Set | Before aging | After aging | Before aging | After aging |
| Conventional CR/NBR glove | 0.25 | 0.25 | 9.30 | 11.70 |
| X-ray detectable CR/NBR glove | 0.21 | 0.21 | 10.55 | 10.62 |
| Standard |  |  | Min 6 | Min 6 |

Remark: Aging condition: Heating at a temperature of 100° C. at a period of 22 hours Based on Table 13, it is noticeable that the X-ray detectable CR/NBR glove of the present invention meets the requirements of EN 455 for the FAB property.

Table 14 displays the results tested against EN 388 (i.e. abrasion and puncture resistances) between X-ray detectable CR/NBR glove of the present invention and the conventional CR/NBR glove (without radiocontrast filler).

TABLE 14

Results tested against EN 388 for X-ray detectable CR/NBR glove of the present invention and the conventional CR/NBR glove (without radiocontrast filler)

|  | Abrasion resistance, Cycles | | Puncture resistance, N | |
| --- | --- | --- | --- | --- |
| Test | Conventional CR/NBR glove | X-ray detectable CR/NBR glove of the present invention | Conventional CR/NBR glove | X-ray detectable CR/NBR glove of the present invention |
| Performance level | 800 (Level 2) | 150 (Level 1) | 25.40 (Level 1) | 21.35 (Level 1) |

Based on Table 14, it is noticeable that the X-ray detectable CR/NBR glove of the present invention has comparable abrasion and puncture resistances level with conventional CR/NBR glove.

Table 15 displays the results tested against OMT based on European regulation for food contact materials (i.e. ethanol and acetic acid) for X-ray detectable CR/NBR glove of the present invention and the conventional NBR glove (without radiocontrast filler).

TABLE 15

Results tested against OMT based on European regulation for food contact materials for X-ray detectable CR/NBR glove of the present invention and the conventional NBR glove (without radiocontrast filler)

|  | Overall migration limit (mg/dm$^3$) | |
| --- | --- | --- |
| Set | Ethanol | Acetic Acid |
| Conventional hybrid NBR/CR glove | 6.42 | 8.97 |
| X ray detectable hybrid NBR/CR glove of the present invention | 5.63 | 6.98 |
| Standard limit | <10 mg/dm$^3$ | |

Based on Table 15, it is noticeable that the X-ray detectable CR/NBR glove of the present invention meets the requirements of OMT based on European regulation for food contact materials. Hence, the X-ray detectable CR/NBR glove of the present invention is safe to be used in the food and beverages industries.

As a whole, X-ray detectable glove of the present invention is able to overcome the conventional shortcomings because it comprises an appropriate radiocontrast filler that is usable for detection of the glove contamination in the food and beverages industries through X-ray based imaging techniques, as well as, meets all the standard requirements for mechanical properties which shows that the mechanical properties are not compromised.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises", "comprising", "including" and "having" are inclusive and therefore specify the presence of stated features, integers, steps, operations, elements and/or components, but do not preclude the presence or addition of one or more other features, integers, steps, operations, elements, components and/or groups therefrom.

The method steps, processes and operations described herein are not to be construed as necessarily requiring their performance in the particular order discussed or illustrated, unless specifically identified as an order of performance. It is also to be understood that additional or alternative steps may be employed. The use of the expression "at least" or "at least one" suggests the use of one or more elements, as the use may be in one of the embodiments to achieve one or more of the desired objects or results.

The invention claimed is:

1. A glove that is X-ray detectable prepared from a latex formulation comprises a base polymer, an accelerator, a vulcanizing agent, a surfactant, a pH adjuster, an antifoaming agent and a thickener, characterized in that the latex formulation further includes a radiocontrast filler, wherein the radiocontrast filler consist of a radiocontrast agent, a surfactant, a thickener and a solvent, wherein the radiocontrast agent in the radiocontrast filler is selected from the group consisting of barium sulphate, nickel, zinc, iron, iron oxide magnetite, bismuth oxide and gadolinium, wherein the radiocontrast agent in the radiocontrast filler is used in an amount ranging between 40% to 60% by weight of the radiocontrast filler, wherein the surfactant in the radiocontrast filler is selected from the group consisting of sodium dodecylbenzene sulphonate, potassium laurate, monosodium salt of sulphated methyl oleate, sodium naphthalene formaldehyde sulphonate, disodium n-octadecylsulphosuccinamate, sodium polyacrylate, ammonium polyacrylate and mixtures therefrom, wherein the surfactant in the radiocontrast filler is used in an amount ranging between 1% to 10% by weight of the radiocontrast filler, wherein the thickener in the radiocontrast filler is selected from the group consisting of acrylic copolymer containing carboxyl group, polysaccharide based thickener and mixtures therefrom, wherein the thickener in the radiocontrast filler is used in an amount ranging between 1% to 10% by weight of the radiocontrast filler, wherein the solvent in the radiocontrast filler is selected from the group consisting of tap water, distilled water and mixtures therefrom, wherein the solvent in the radiocontrast filler makes up the remaining content of the radiocontrast filler, wherein the radiocontrast filler is used in an amount of at least 10 phr of the latex formulation and wherein the radiocontrast filler has total solid content of 45%.

2. The glove as claimed in claim 1, wherein the radiocontrast filler has an average particle diameter size ranging between 5 µm to 50 µm.

3. The glove as claimed in claim 1 is able to be detected by an X-ray detector with a minimum glove thickness of 0.25 mm.

4. The glove as claimed in claim 1 is single layered.

5. The glove as claimed in claim 1 is multi-layered.

* * * * *